(12) United States Patent
Muldoon (10) Patent No.: US 7,095,140 B2
(45) Date of Patent: Aug. 22, 2006

(54) CONTROL USING TRANSDUCERS PRESENT TO DETERMINE MODEL

(76) Inventor: Alfred Wade Muldoon, 2603 Willa Dr., St. Joseph, MI (US) 49085

( * ) Notice: Subject to any disclaimer, the term of this patent is extended or adjusted under 35 U.S.C. 154(b) by 625 days.

(21) Appl. No.: 10/082,481

(22) Filed: Feb. 25, 2002

(65) Prior Publication Data

US 2003/0160519 A1 Aug. 28, 2003

(51) Int. Cl.
*H03K 3/00* (2006.01)
*F25F 27/02* (2006.01)

(52) U.S. Cl. .......................... 307/149; 62/127; 62/698
(58) Field of Classification Search ................ 307/149; 62/127, 153, 698, 12.02
See application file for complete search history.

(56) References Cited

U.S. PATENT DOCUMENTS

| | | | |
|---|---|---|---|
| 6,549,866 B1 * | 4/2003 | Bhatnagar | 702/86 |
| 6,739,145 B1 * | 5/2004 | Bhatnagar | 62/127 |
| 6,751,888 B1 * | 6/2004 | Lueckenbach | 34/595 |
| 6,850,252 B1 * | 2/2005 | Hoffberg | 715/716 |

* cited by examiner

*Primary Examiner*—Bao Q. Vu (57) ABSTRACT

An adaptive control, capable of operating a plurality of models, that determines which model it is operating by scanning its output device circuits. The control automatically deleting options requiring output devices the scan determines not to be present. A model may be further defined by detecting other components that alter the impedance of the output device circuits. These components allow a circuit to further identify the features beyond simply which output device is present and/or enable the control to determine whether an output device is not present or is non-functional. When applied to control panels using display elements to indicate the options selected, the present invention permits deletion of an option(s) without removing the switch used to select that option. This allows a single contact to select from a group of options any of which may be deleted by removing the corresponding display element from the panel. To extend the model range, control panels using position switches rather than display elements to indicate options can be handled using the I/O and scan. A complete circuit indicates the presence of an option whether it is completed by a display output device or the contacts of a switch.

19 Claims, 11 Drawing Sheets

OPTIONS ARRAY - BRAND A, NORMAL CYCLES, DEEP RINSE

|  | C0 | C1 | C2 | C3 | C4 | C5 | C6 |
|---|---|---|---|---|---|---|---|
| R0 | TIME | DIS | PLAY | - | - | TENS | DIGIT |
| R1 | TIME | DIS | PLAY | - | - | ONES | DIGIT |
| R2 Water Level | HIGH | MED HIGH * | MED * | MED * | LOW * |  | SOAKING |
| R3 |  |  |  | WARM RINSE * | DELAY * |  | WASHING |
| R4 WATER TEMP | HOT * | WARM ETC * | WARM * | COLD ETC * | COLD * |  | RINSING |
| R5 CYCLE PARTS | SOAK * | PRE-WASH * | RINSE/ SPIN * | SPIN ONLY * | EXRA RINSE * |  | SPINNING |
| R6 CYCLE | HEAVY | NOR-MAL * | PERMA-PRESS * | GEN-TLE * | DELI-CATE * | HAND WASH * |  |

FIGURE 6

ROW R6 - BRAND B, NORMAL CYCLES

|  | C0 | C1 | C2 | C3 | C4 | C5 | C6 |
|---|---|---|---|---|---|---|---|
| R6 CYCLE |  | HEAVY | REGU-LAR * | PERMA-PRESS * | DELI-CATE * | HAND WASH * |  |

7A

ROW R6 - BRAND C, NORMAL CYCLES

| R6 CYCLE |  |  | HEAVY | REGU-LAR * | PERMA-PRESS * | DELI-CATE * | HAND WASH * |
|---|---|---|---|---|---|---|---|

7B

ROW R2 - SPRAY RINSE

| R2 WATER LEVEL |  | HIGH | MED HIGH * | MED * | MED LOW * | LOW * | SOAK-ING |
|---|---|---|---|---|---|---|---|

OPTIONS ARRAY - SPEED CYCLES, BRAND B, SPRAY RINSE

|  | C0 | C1 | C2 | C3 | C4 | C5 | C6 |
|---|---|---|---|---|---|---|---|
| R0 | TIME | DIS | PLAY | - | - | TENS | DIGIT |
| R1 | TIME | DIS | PLAY | - | - | ONES | DIGIT |
| R2 WATER LEVEL |  | HIGH | MED HIGH * | MED * | MED LOW * | LOW * | SOAKING |
| R3 SPEED CYCLE | HEAVY * | PERMA * | LIGHT * | WARM RINSE * | DELAY * |  | WASHING |
| R4 TEMP | HOT * | WARM ETC * | WARM * | COLD ETC * | COLD * |  | RINSING |
| R5 CYCLE PARTS | SOAK * | PRE-WASH * | RINSE/SPIN * | SPIN ONLY * | EXTRA RINSE * |  | SPINNING |
| R6 AGIT/SPIN |  | SPEED 1 | SPEED 2 * | SPEED 3 * | SPEED 4 * | SPEED 5 * |  |

8A

ROW R6 - BRAND A, SPEED CYCLES

| R6 AGIT/SPIN | SPEED 1 | SPEED 2 * | SPEED 3 * | SPEED 4 * | SPEED 5 * | SPEED 6 * |  |
|---|---|---|---|---|---|---|---|

8B

ROW R6 - BRAND C, SPEED CYCLES

| R6 AGIT/SPIN |  |  | SPEED 1 | SPEED 2 * | SPEED 3 * | SPEED 4 * | SPEED 5 * |
|---|---|---|---|---|---|---|---|

BRAND C - NORMAL CYCLES, POSITION TIME DISPLAY

|  | C0 | C1 | C2 | C3 | C4 | C5 | C6 |
|---|---|---|---|---|---|---|---|
| R0 | 40 MIN | 35 MIN | 30 MIN | 26 MIN | 22 MIN | 18 MIN |  |
| R1 | 14 MIN | 12 MIN | 10 MIN | 8 MIN | 6 MIN | 4 MIN | 2 *** MIN |
| R2 WATER LEVEL | HIGH | MED HIGH * | MED * | MED LOW * | LOW * |  | SOAKING |
| R3 |  |  |  | WARM RINSE * | DELAY * |  | WASHING |
| R4 WASH TEMP |  | HOT * | WARM ETC * | WARM * | COLD ETC * | COLD * | RINSING |
| R5 CYCLE PARTS | SOAK * | PRE-WASH * | RINSE /SPIN * | SPIN * | EXTRA RINSE * |  | SPINNING |
| R6 CYCLE |  |  | HEAVY * | REGU-LAR * | PERMA-PRESS * | DELI-CATE * | HAND WASH * |

*** Removing the R1C6 segment indicates the washer has no time remaining display

CONTROL USING TRANSDUCERS PRESENT TO DETERMINE MODEL

CROSS-REFERENCE TO RELATED APPLICATIONS

Not Applicable

STATEMENT REGARDING FEDERALLY SPONSORED RESEARCH

Not Applicable

REFERENCE TO SEQUENCE LISTINGS

Not Applicable

BACKGROUND OF THE INVENTION

The present invention relates to controls that alter their operation to handle a plurality of models, in particular to controls that automatically identify the features of the model it is operating. Typically each control has handled only a single or very few of the models. Material and labor costs to include model identifying parts as well as the extra control I/O and program memory requirements to read these parts have exceeded the cost benefits realized by the volume production possible for a universal control.

The model options the present invention is concerned with affect the operation of the control. These options can generally be divided into two types, operator and preset. Operator options are chosen by the operator, typically with a control panel, to adjust the operation of the device. Preset options are fixed at the time of manufacture.

In prior art, deletion of an operator option is often accomplished by removing the switch connection used to select that option. Removing the switch connection eliminates the possibility of the operator selecting its option whether it be made by a momentary or position switch. This technique requires a unique switch connection for each operator option. It is not applicable to panels in which a single switch connection is used to choose from a group of options indicated by display elements.

Another prior method used to determine options, is to have the control read ID circuits, connections dedicated solely for identification purposes. Typically ID circuits determine preset options, such as brand and the number and type of output devices in the model. Each additional ID connection adds to the cost of the control. An ID connection may represent an individual feature or group of features. Individual connections allow the greatest flexibility as any combination of features is possible. Fewer group ID connections are required, but this approach requires more program space to look up what options belong to what connection while allowing fewer potential models.

Each option represented by an ID connection requires an additional circuit and a means to selectively read it. Placing ID connections on the control means it is not universal since the connections must be set for each model. Alternatively making ID connections off the control board enables the control to be universal but requires extra connectors, connections and wires to make the ID connections. In either case the extra I/O, connections, labor and parts to complete them and program memory to read and decode them raises the cost of the control. In U.S. Pat. No. 5,412,291 the wiring harness makes ID connections saving one set of connectors. This approach trades a universal control for the requirement of a unique harness for each model.

Another type of automatic identifying process is seen in personal computers. A PC scans components such as memory boards to identify the amount of memory present. The PC scans components designed to receive and transmit data to determine the options available. U.S. Pat. No. 6,739,145 uses this approach utilizing configuration memory to identify options. The output devices scanned by the present invention are not designed to transmit data to the control through the energizing circuit.

The present invention also relates to controls that scan the circuits of output devices to correctly and safely operate the output device. However while proir art shows controls altering their operation based on these scans, prior techniques do not teach using scans of output devices to identify the options of the model it is operating. In prior art scan of output device circuits allow proper operation of a model they do not identify the model. The control is either model specific or as in the case of U.S. Pat. No. 6,739,145 it uses others means to identify the model.

SUMMARY OF INVENTION

An adaptive control that automatically limits its operation to options for which the requisite output devices are determined to be present. In this application, an output device is a device, operated by the control, whose function is to turn the electrical energy into some other energy form, typically, but not limited to, motor windings, solenoids, heating elements and display elements (LED, LCD, VF, EL, incandescent, etc.). The control uses sensing means, typically employing multiple sensors, to determine which output devices are present by scanning the circuits used to energize output devices.

An output device circuit may indicate an operator and/or a preset option. The scan can further define the model by detecting the presence of additional components affecting the impedance of the output device circuits. Preferred implementations require no components or connections, unique to the scan, remote from the control to identify which output devices are present.

In preferred implementations a single sensor scans the circuits of similar output devices sharing a node or path. The control employing the selection means, circuitry used to selectively energize output devices, to allow the sensor to read the circuits as required to identify options. Typically the sensor costs less than the parts needed to create and read a single dedicated ID connection. There is no incremental cost to handle each additional option, resulting in significant cost reduction for devices with large numbers of options.

The simplest scan must only determine the near infinite difference in impedance between an open and intact circuit. An enhanced scan capable of distinguishing smaller differences in impedance is used when the control must determine which component(s) complete a path. Enhanced scanning can identify options defined by the type or number of output devices in a circuit. The present invention also encompasses the use of additional components in the output device circuit to alter circuit impedance to further define options or to allow the control to distinguish between a fault and an absent output device.

In the present invention components an operator can read to determine which operator options have been selected also indicate to the control which options are present. The indicating components must be display elements on at least one model. It is the presence of the display elements in circuits that indicates to the control a model has an option, it is not necessary to remove the switching means used to select the option. Thus a single switching means, typically a momentary switch, can be used to select from a group of options any or all of which may be deleted by removal of the corresponding display element(s).

To extend the model range position switch contacts may be added to or substituted for display elements to create models using position switches to select options. Since the same I/O lines are used the position of the switches can be read using the same sensor. When the same sensor is used there is no hardware cost unique to handling either type of indicator. Preferably a circuit represents the same option regardless of the type of indicator used on a model.

While removal of an output device or other component from the output device circuit is typically the means used to delete an option, any method of creating an open path causing a component to go undetected will delete the option.

DESCRIPTION OF PREFERRED EMBODIMENT

Although the following embodiment is a washing machine it is to be understood that the inventor contemplates the invention being applied to other devices with the same or different output devices, output device circuit components, switching means, transducers and sensing means. Further the inventor comtemplates the use of the invention with controls scanning components and devices for additional purposes other than model identification.

Figure 2:
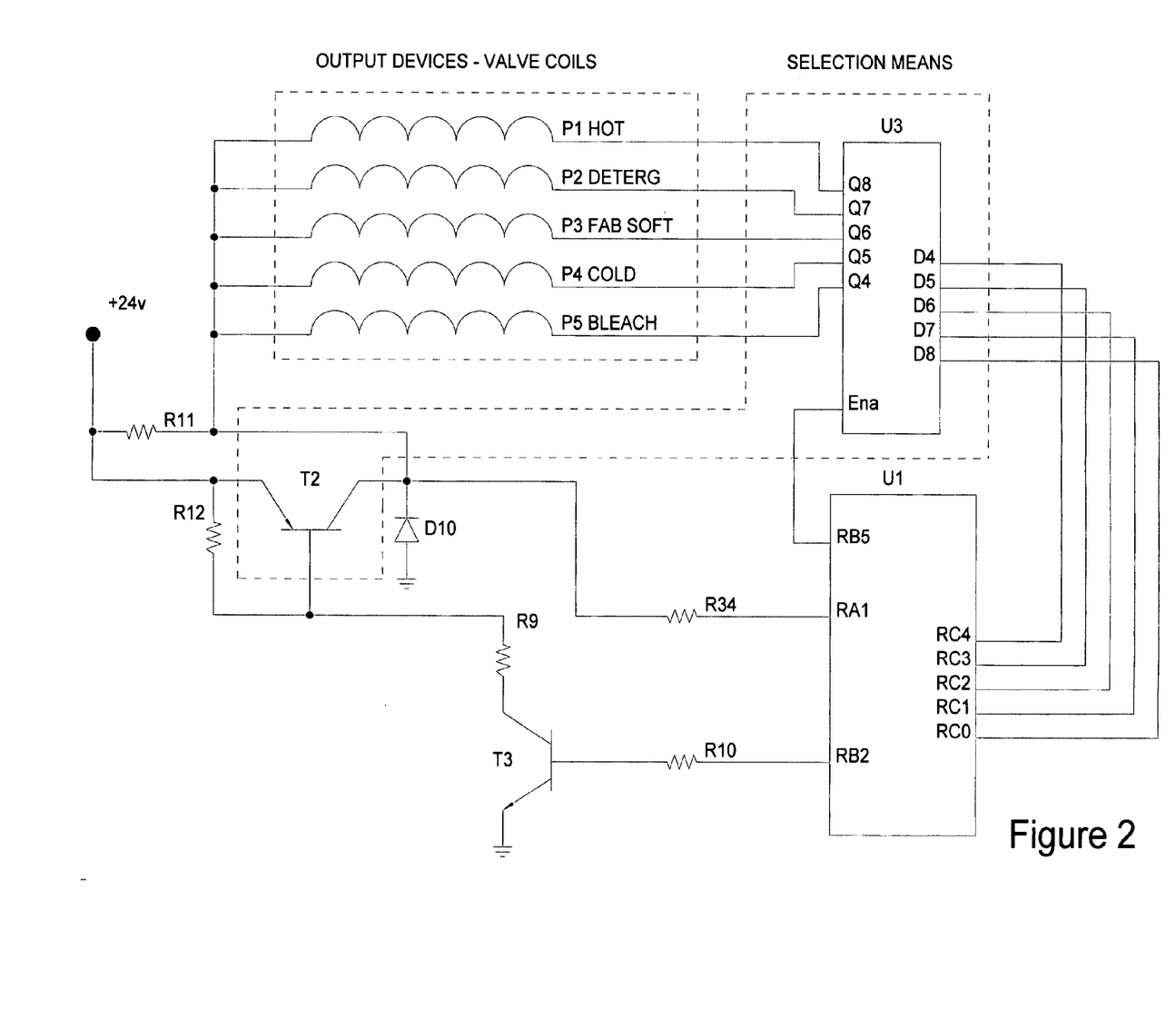
FIG. 2 shows the circuitry to drive and sense the valves of the washer.
Figure 3:
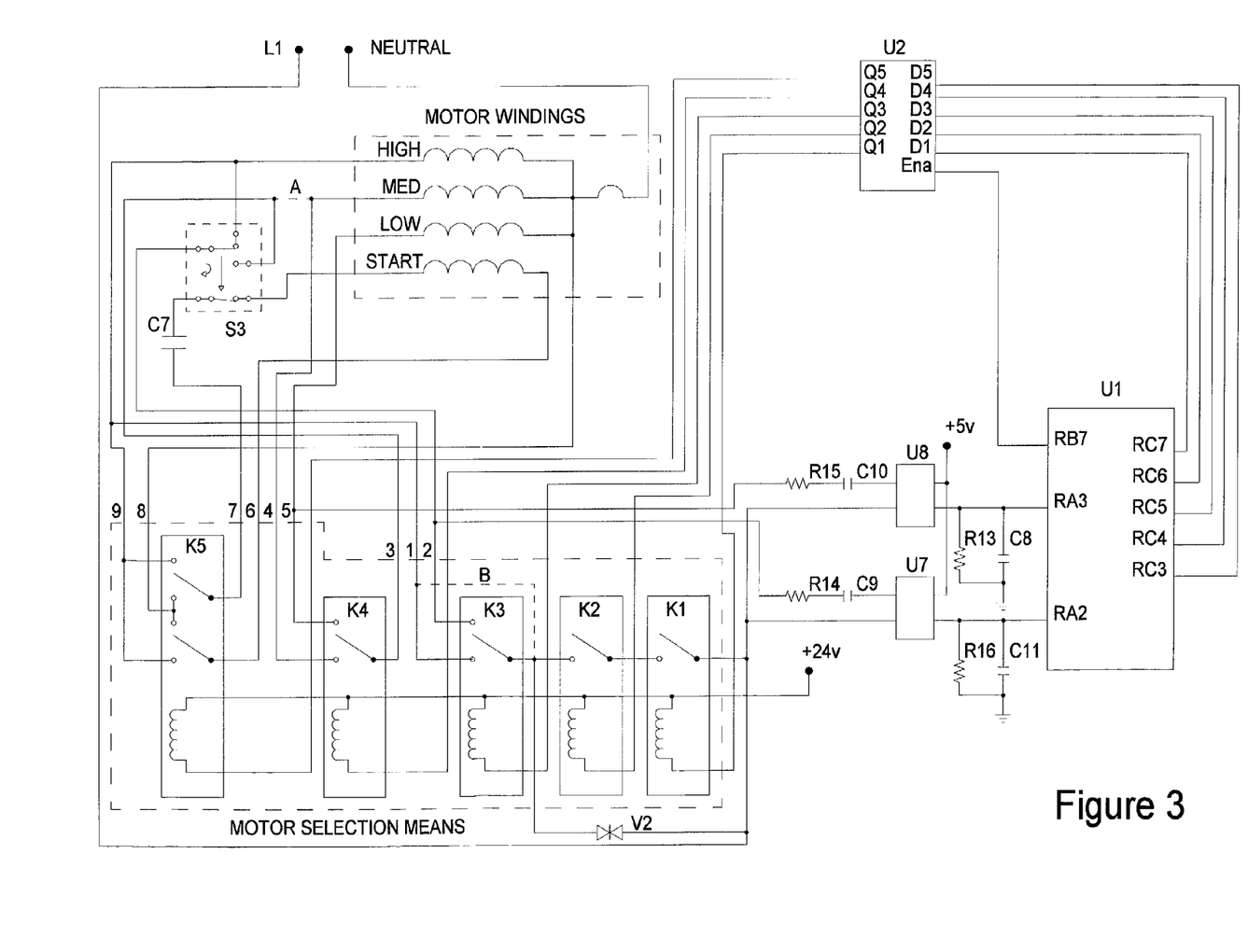
FIG. 3 shows the circuitry to drive and sense the motor windings.

In the preferred embodiment the control operates a line of washing machines. Models have one of three motors; a single, dual or three speed unit. Models may have in any combination a detergent valve P2, a fabric softener valve P3 and/or a bleach valve P5. There are two types of control panel. Type I uses LEDs, Type II uses the position of switches to indicate options. The circuits selecting and sensing the circuits of the control panel, the dc valves and the ac motor windings are shown in FIGS. 1, 2 and 3 respectively.

Figure 1:
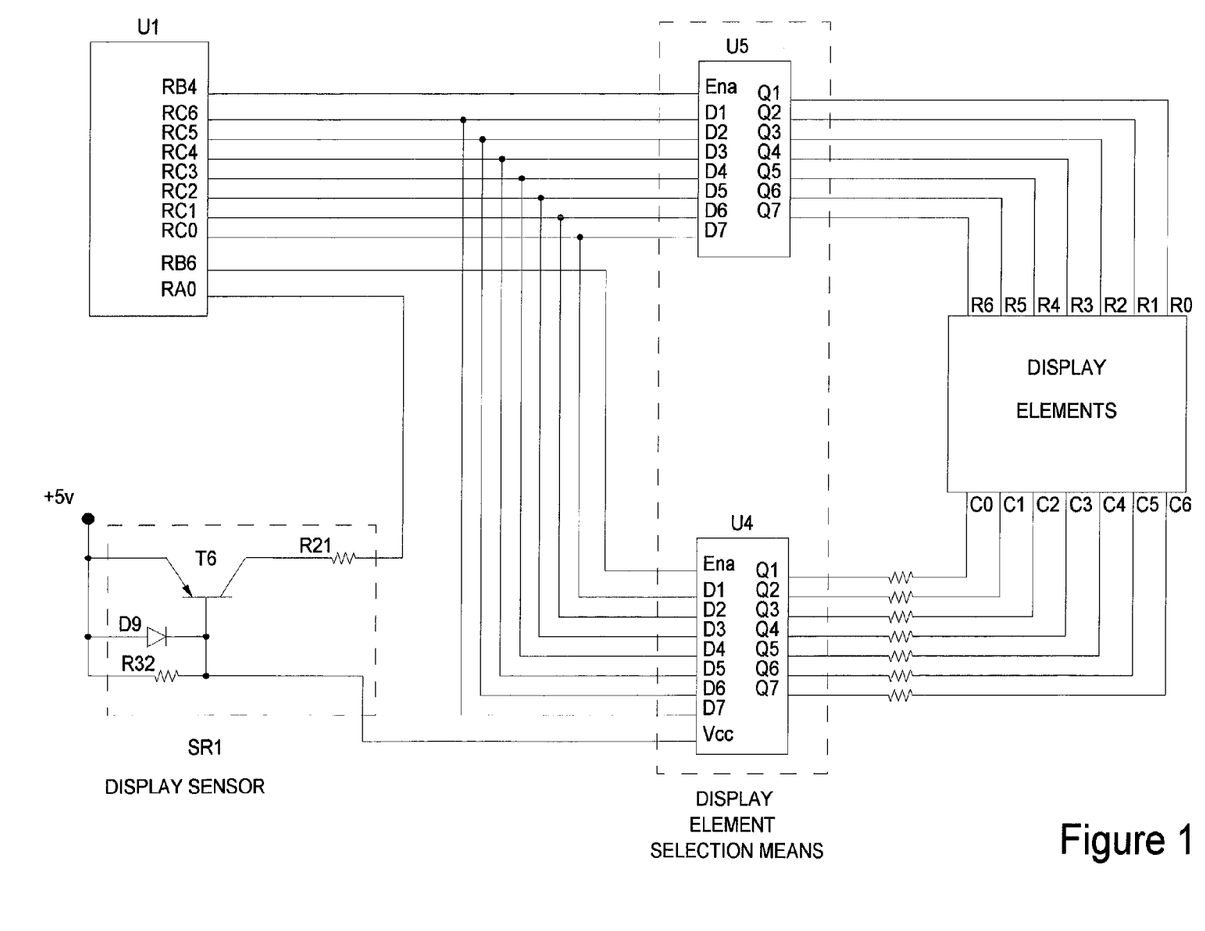
FIG. 1 shows the circuitry to drive and sense the LEDs used on the control panel of a washer.

There are no control components in FIG. 1 that are unique to the type of panel, hence there is no control hardware cost for the flexibility to handle both types of control panel. Type I panels (FIG. 4) use LEDs to indicate which options the operator has selected using its momentary switches. On Type II panels (FIG. 5) the operator uses position switches to select options. Rotary switches are shown but any style may be used. Type II panels also include three momentary switches START, TIME and OFF. The models in both FIGS. 4 and 5 use dual seven-segment displays to show the minutes remaining in a wash. The status LEDs—WASHING, RINSING, SPINNING and SOAKING (FIG. 4 only) display the current mode of the washer.

Figure 4:
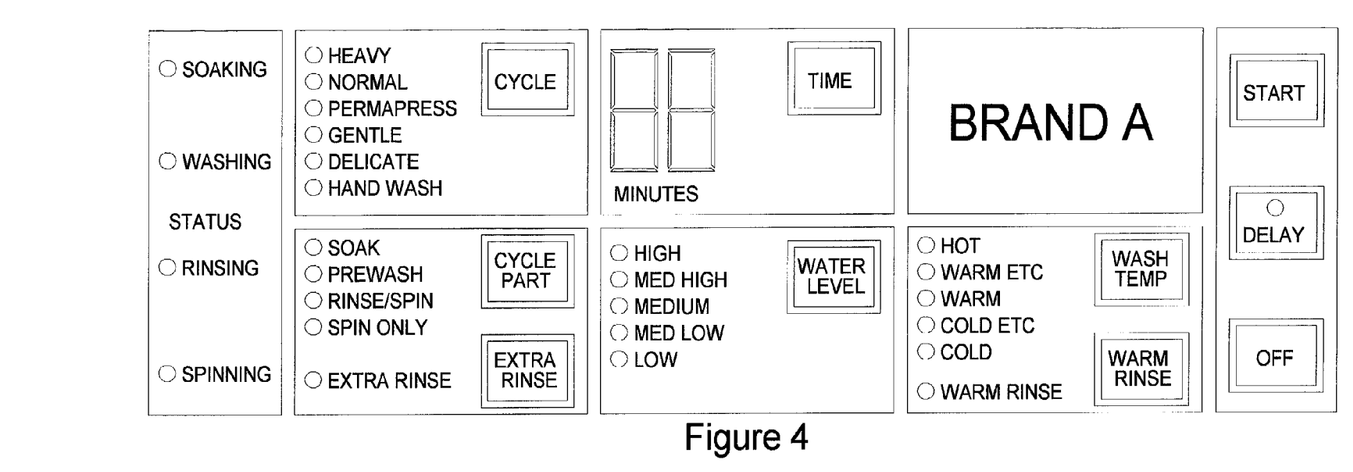
FIG. 4 shows a Type I control panel for brand A.

The Type I panel in FIG. 4 is for a brand A model. Each group of options has a sequencing key—CYCLE, CYCLE PART, WATER LEVEL and WASH TEMP. Pressing a sequence key advances the display to the next available option of that group. The switches EXTRA RINSE, WARM RINSE and DELAY toggled on/off the corresponding options.

The cycle sequence is HEAVY, NORMAL, PERMAPRESS, GENTLE, DELICATE, and HAND WASH returning to HEAVY when CYCLE is pressed with HAND WASH selected. The partial cycle sequence is SOAK, PREWASH, RINSE/SPIN, SPIN ONLY and no option selected returning to SOAK. The WATER LEVEL sequence is HIGH, MED HIGH, MEDIUM, MED LOW and LOW returning to HIGH. The wash temperature, sequence is HOT, WARM ETC (electronic temp control), WARM, COLD ETC, COLD and returning to HOT.

For models created without an option(s) in a sequence the control will automatically advance to the next available option when the selection key is pressed. From the point of view of the operator the control performs as though it was specifically designed for the model it is running.

Pressing START begins a cycle. Pressing OFF turns off the display when it is not in a cycle. During a wash pressing OFF once pauses operation. When paused pressing START ends the pause. If OFF is pressed again during a pause the washer is turned off. TIME is used to adjust the length of a wash cycle.

Figure 6:
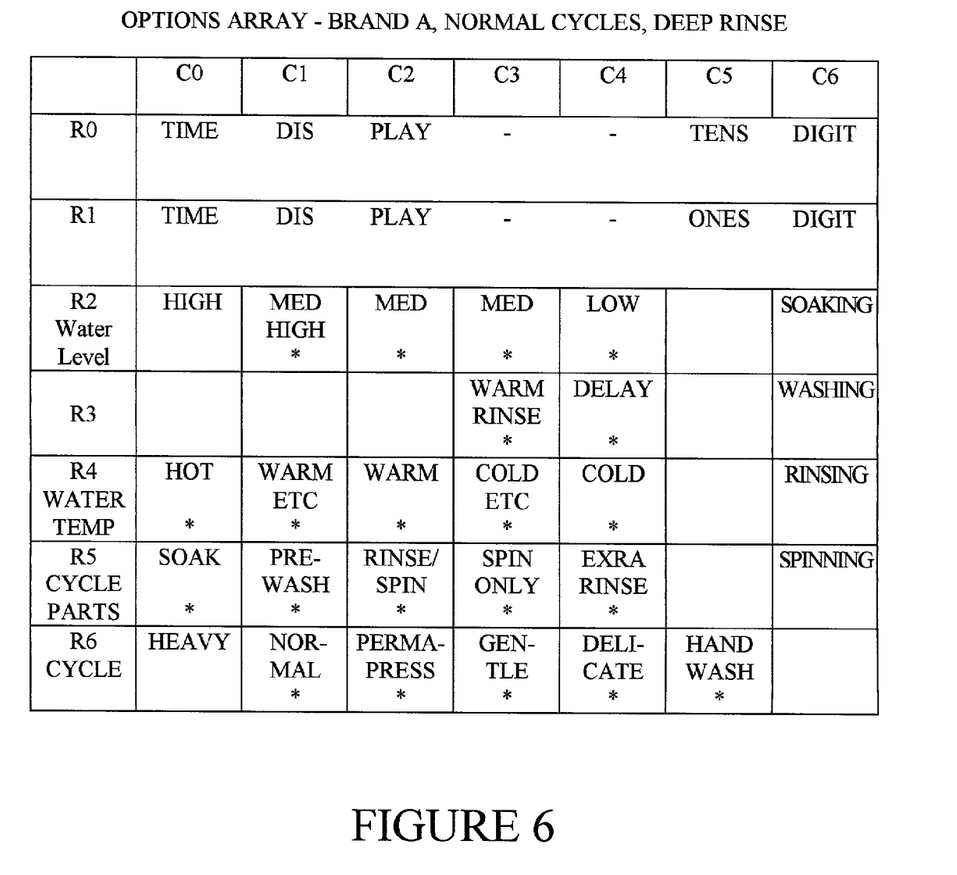
FIG. 6 shows the array connections of a brand A washer with normal cycles and deep rinse.

The LEDs are in a multiplexed array driven by row. FIG. 6 shows the LED arrangement for brand A options. There are seven rows, R0–R6 and seven columns, C0–C6. Variables DD0–6 contain display data for rows R0–R6. The first seven bits of DDx contain the data for columns C0–C6 for row Rx. An LED is on when the corresponding bit of DDx is a one.

R6 contains the cycle options HEAVY, NORMAL, PERMAPRESS, GENTLE, DELICATE, and HAND WASH. R5 contains the partial cycles options SOAK, PREWASH, RINSE/SPIN, SPIN ONLY and the option EXTRA RINSE. R4 contains wash temperature options HOT, WARM ETC, WARM, COLD ETC, COLD.

R3 contains the options WARM RINSE and DELAY. R2 contains the fill level options HIGH, MED HIGH, MEDIUM, MED LOW and LOW. R0 and R1 contain the data, respectively, for the tens digit and ones digit of the dual seven-segment time remaining display. C6R2–R5 contain the status LEDs—SOAKING, WASHING, RINSING, and SPINNING. The status LEDs while optional have no effect on the operation of the control. The cell is energized at the appropriate times and if present the status LED will be on.

Any cell with an asterisk * represents an operator option that may be deleted. To delete an option to make a lesser model remove the LED corresponding to that option. As an example, to create a brand A model without PERMAPRESS remove the LED from location R6C2. No changes to the control or the interfacing to the panel are needed.

The only difference between panels is the printing on the face and the number and placement of LEDs. The rest of the typical membrane panel including the middle offset layer(s) is the same. New models can be created using any mix of existing features with no changes to the control. New features can be added by assigning an unused cell in the array to the new option or the array can be expanded. The updated control will be backwards compatible since the new location was unused and empty on previous models. Hence earlier panels will scan as not having the new option.

The reason, cells containing the cycle HEAVY and the level HIGH do not have an *, is that all models have these features. In this embodiment the present invention uses these universally occurring operator options to define preset options without the use of additional components. The location of the LED of the universal option determines a preset option.

Figure 7:
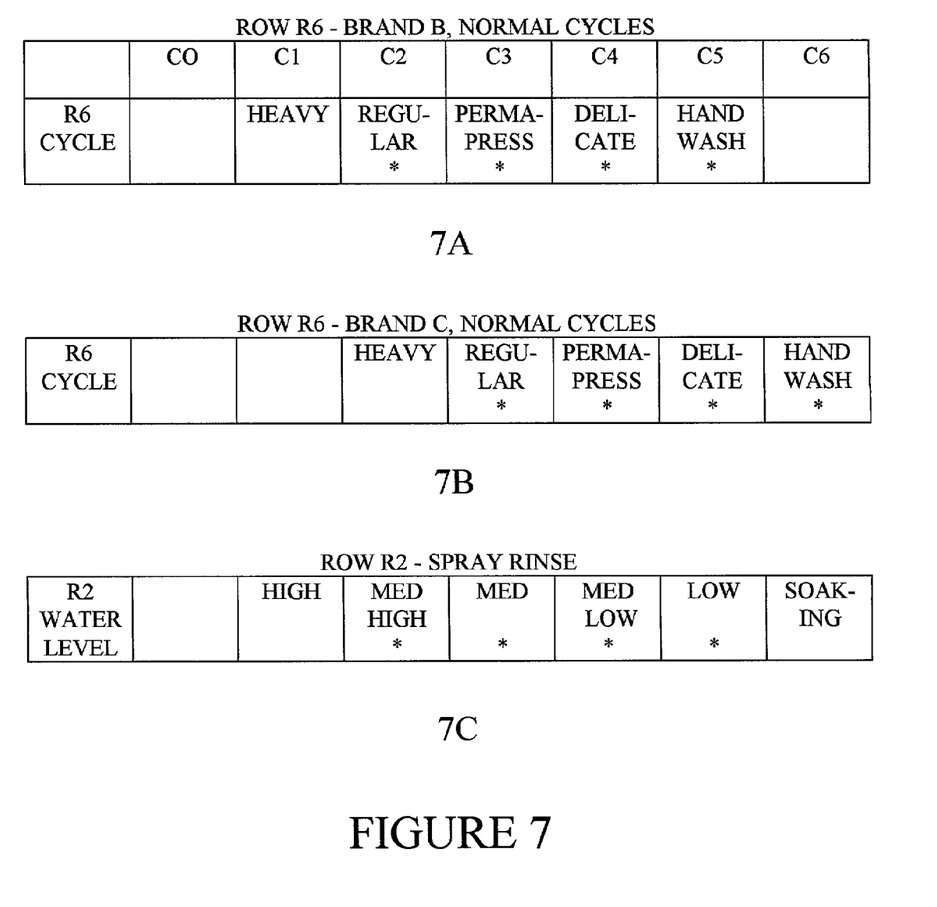
FIG. 7A shows R6 for a brand B washer with normal cycles.
FIG. 7B shows R6 for a brand C washer with normal cycles.
FIG. 7C shows the connections of R2 for a washer with spray rinse.

FIGS. 7A and 7B show the changes made to row R6 of the array to identify preset option, brand. FIGS. 7A and 7B show the placement of LEDs for brands B and C respectively. For brands B and C the cycles are HEAVY, REGULAR, PERMAPRESS, DELICATE, and HAND WASH.

HEAVY is brand specific as are all cycles. Removing the R6C0 LED does not delete HEAVY it changes the brand of washer. This saves the cost of a "brand" component or connection and the cost to mount it. Establishing the brand of the washer allows the same control to operate unique cycles for each brand just as most cycles are unique to the type of motor present.

The location of the water level option, HIGH, serves to determine the type of rinse—deep or spray (FIG. 7C). When location R2C0 contains the first LED in R2 the washer has a deep rinse. When R2C1 contains the first LED in R2 the washer uses a spray rinse. Either type of rinse may be used on any washer.

Figure 8A:
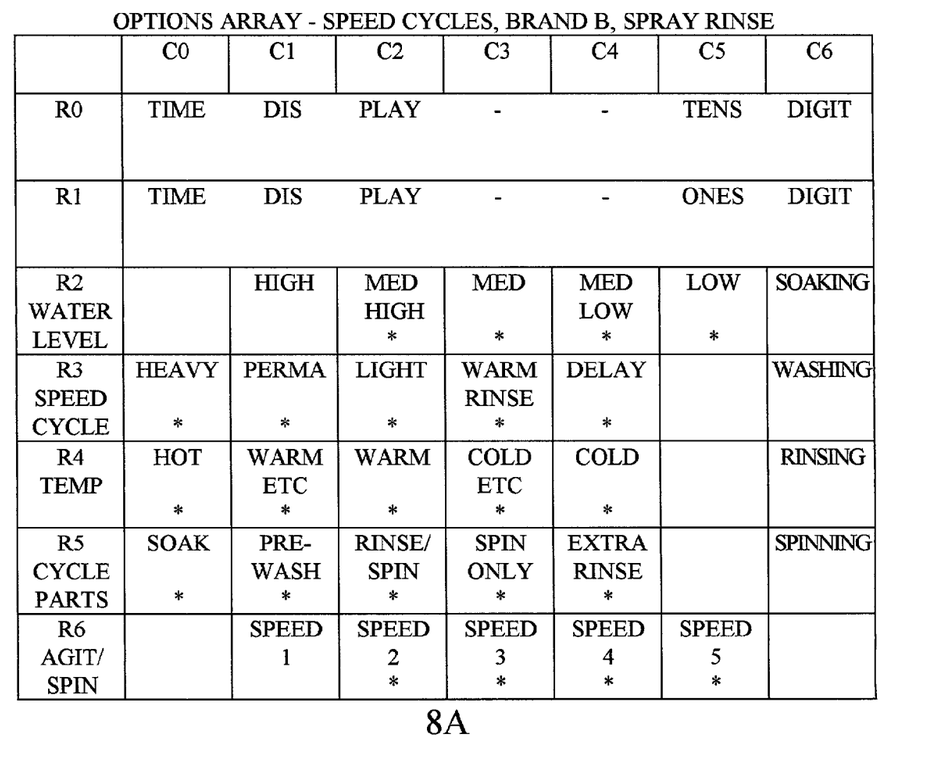
FIG. 8A shows the array connections of a brand B washer with speed cycles and spray rinse.
Figure 8B:
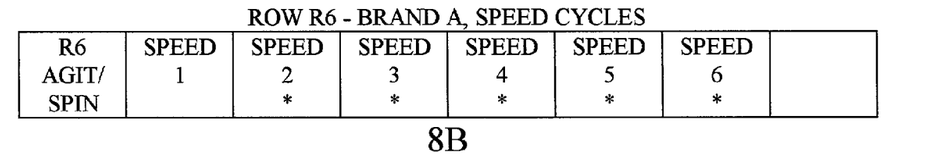
FIG. 8B shows R6 for a brand A washer with speed cycles.
Figure 8C:
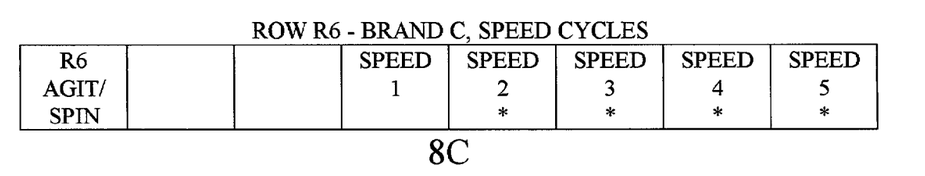
FIG. 8C shows R6 for a brand C washer with speed cycles.

Another preset option is speed cycles. For a model with speed cycles the operator not only selects a cycle but also the agitate and spin speeds at which the cycle will run. An LED in any of the locations R3C0–R3C2 indicates to the control that the washer has speed cycles (FIGS. 8A–C). The cycle options are HEAVY, PERMAPRESS and LIGHT.

In this type of washer the operator selects the type of cycle from those present in R3C0–R3C2 and selects from the agitate and spin speed combinations SPEED 1–6 for brand A (SPEED 1–5 for brands B and C) present in R6. For models with speed cycles all brands have a SPEED 1 combination. SPEED 1 is always the first LED in R6. When the first LED is in R6C0, R6C1 or R6C2 the washer is a brand A, B or C respectively.

Figure 9:
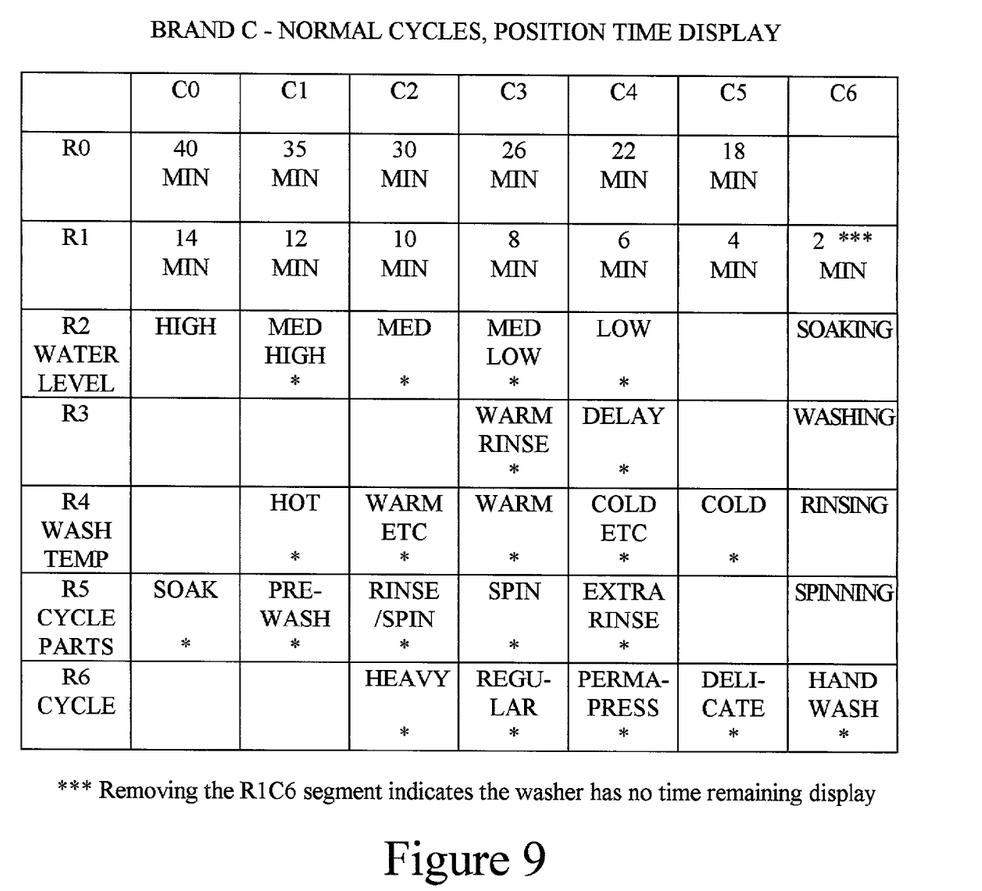
FIG. 9 shows the array connections of a brand C washer with normal cycles and deep rinse using a position time remaining display.

Positions R0C6 and R1C6 are used to determine the type of time remaining display. FIG. 9 shows an array for panels using a position time remaining display rather than a dual seven-segment as in FIGS. 6–8. R0 contains the LEDs indicating 40, 35, 30, 26, 22 and 18 minutes left. R1 contains the LEDs indicating 14, 12, 10, 8, 6, 4 and 2 minutes left.

The type of time display is independent of other options. An LED in location R0C6 indicates a dual seven-segment. If there is no LED in R0C6 but there is one in R1C6 the panel has a position time display. If both R1C6 and R0C6 are empty, the display has no time remaining display—typical of commercial units. There is no time adjustment allowed on models without a time display.

One sensor SR1 is the preferred method of scanning all the locations of the LED array (FIG. 1). One location is scanned at a time. SR1 detects the current through Vcc of U4 and the LEDs. The location scanned by SR1 is determined by the selection means, U5 and U4. Outputs Q1–Q7 of the latched drivers U5 and U4 change to the state of inputs D1–D7 as determined by RC6–RC0 when RB4 and RB6 take the respective enable line Ena high. Diode D9 maintains the same voltage drop across SR1 when one or more LEDs are driven at the same time.

The quiescent current of U4 will not turn on T6. When the test cell is empty cell T6 remains off. When an LED is present the voltage drop across R32 is sufficient to turn on T6 signaling the CPU U1, through R21, on RA0. The only components unique to the scanning of the display are those of SR1. No connections other than those used to drive the display are necessary to scan the display.

Figure 10:
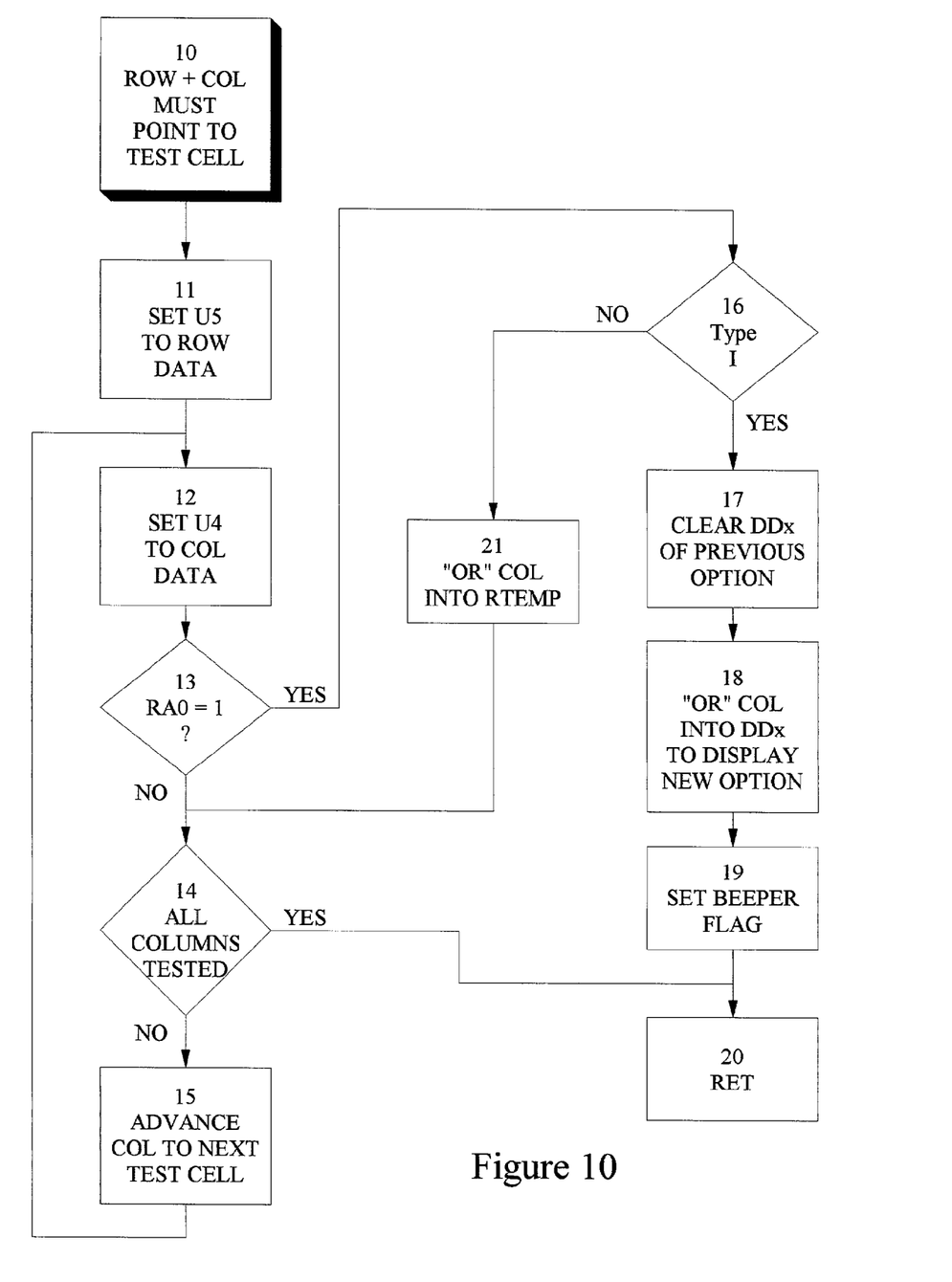
FIG. 10 shows the flow chart of the routine used to scan option indicating control panel circuits.

The control uses the subroutine in FIG. 10 to scan the array. The locations indicating preset options are scanned when the washer is (re)connected to ac. The result of scans for preset options are stored in memory. The control scans for an operator option only when a key is struck that would select that option. Rather than scan the array and store in memory which operator options are present, the control scans the circuits of the array as needed using the array as "ROM". The routine is called before the display is refreshed after a valid key strike is detected.

Variables ROW and COL must contain the address of the first cell to be tested when execution jumps to step 10. Step 11 turns on the row of the test cell. Step 12 turns on the column of the test cell. In step 13, U1 reads SR1 on RA0, if the cell contains an LED the program proceeds to step 16. If there is no LED, step 14 checks if there are any untested cells in the group. If all cells have been tested step 20 is executed returning to the main program without triggering the beeper ignoring the key strike. This allows a switch for which no options are present on a model to be included increasing the commonality of panels. Such a switch if inadvertently pressed will not alter the operation from the perspective of the operator.

If there are untested cells, step 15 advances COL to the next column. Step 12 resets the column drivers turning on just the column pointed to by the updated COL. When step 13 indicates a test cell connection, step 16 directs the program to step 17 for panels without position switches. Step 17 clears the bit of DDx indicating the previous option. Step 18 then adds the location of the new option to the display data, DDx of ROW. Then step 19 sets a flag to trigger the beeper to signal the operator that it detected the depressed key. Step 20 returns to the main program.

To detect preset options when the washer is (re)connected to ac the routine in FIG. 10 is used to read rows R0, R1, R2, R3 and R6. The subroutine is called once per row. Reading R0 and R1 determines the type, if any, of time remaining display. Reading R2 sets the type of rinse. R3 indicates whether the model has speed cycles. R6 determines the brand and type of control panel.

When the preset options are read the flag for the type of panel is not yet set. Until it is set after returning from reading R6 when a connection is detected in step 13, step 16 will send the program to step 21. All the connections in the row are stored in RTEMP. The routine ends when step 14 determines all the columns of the row have been read returning through step 20. After a row is read flags indicating preset option(s) of that row are set in the program.

For Type II panels, positions switches are used to select operator options. The position of a switch rather than an LED indicates which option is selected. The present invention uses the same selection means and connections to handle both types of panel. In this embodiment SR1 scans both types of panel. To simplify control programming, row-column connections signify the same option whether completed by an LED or switch contacts.

Figure 5:
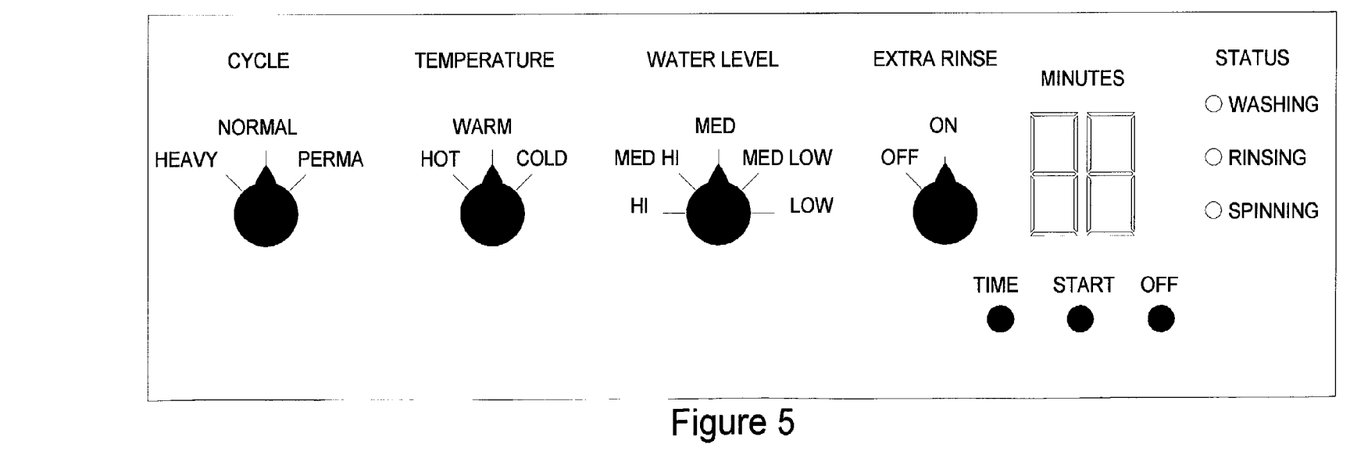
FIG. 5 shows a Type II control panel for brand A.
Figure 11:
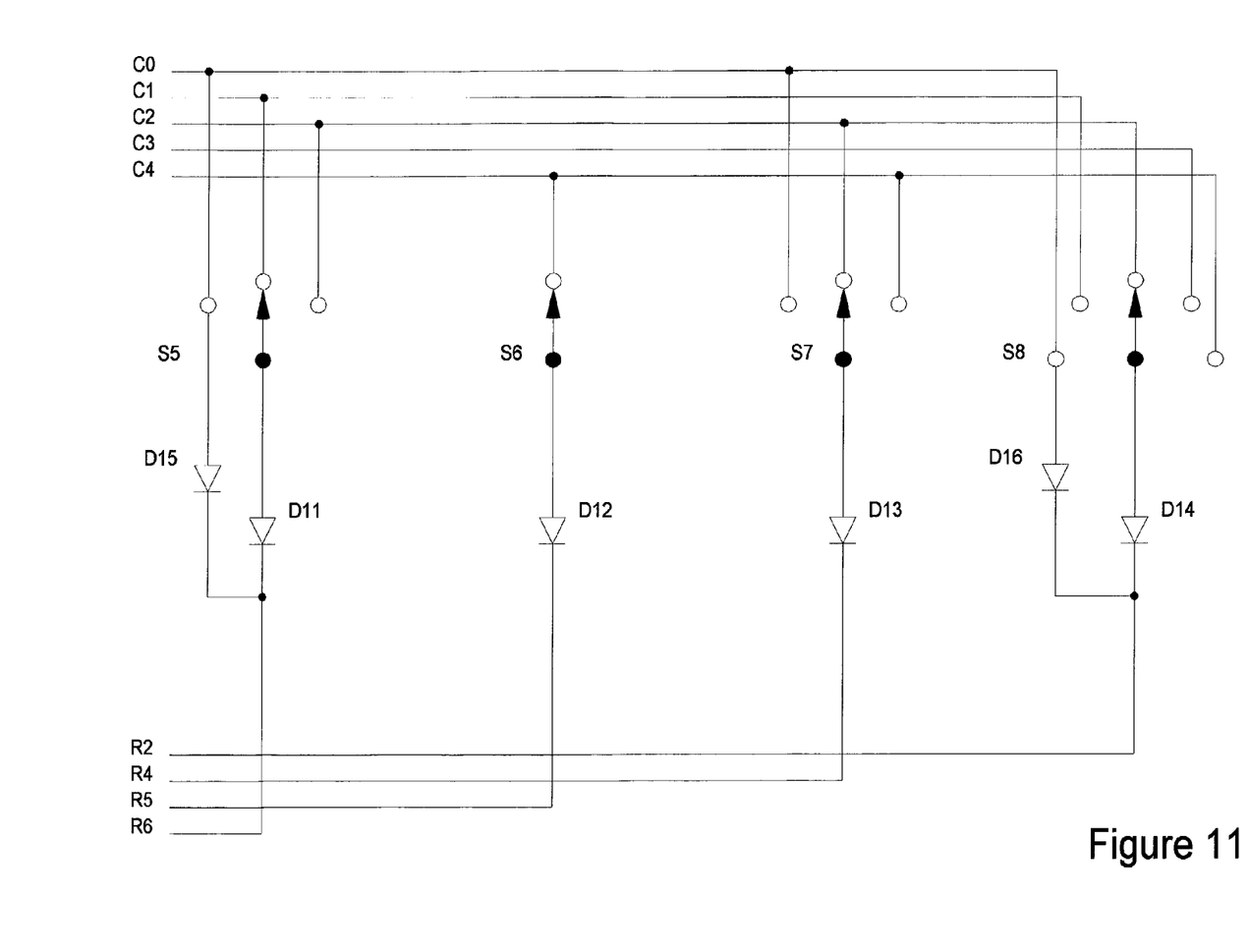
FIG. 11 shows the arrangement of position switches and diodes on type II control panels.

The position switches used for the panel in FIG. 5 are connected as shown in FIG. 11. Switch S5 selects the cycle, S6 selects EXTRA RINSE, S7 selects the wash temperature and S8 selects the water level. The switches are also scanned using the routine in FIG. 10. All the operator options are scanned between each refreshing of the display to determine if any switch position has change. The subroutine is called 5 times between each display refresh one time for each row R2–R6. All the columns of a row that contain connections representing operator options are scanned when the routine is called. Step 21 adds each connection to the temporary variable RTEMP. When all cells have been tested, step 14 jumps to step 20 returning to the main program. At this point RTEMP is compared to the previous switch settings stored in DDx for a Type II.

If no change has been made the control reads the next row until all five rows have been read. Then the display is refreshed. When the position of a switch has changed the new options are stored (DDx) and the time display is updated to reflect the changes. Position switch panels also use a limited number of momentary switches. The switches are START, OFF and TIME. The function of these switches is the same for a Type I panel.

The diodes in FIG. 11 are present to handle two differences between Type I and II. First current may flow in either direction though a switch. Diodes D11–14 direct the current in the same way the LEDs do on Type I panels. By connecting the diodes between the row and the switch only one diode is needed for each option group. On lesser models diodes can be eliminated on any switch that serves as the sole connection in a row.

The second difference between panel types is that a connection is only present when the switch is in the corresponding position. Since the only time the control "knows" it has an operator option for either panel type is when the option is selected this is only a problem for preset options. Diodes D15 and D16 are used to ensure that regardless of the position of S5 and S8 when the washer is (re)connected to ac the control will identify the unit as brand A with deep rinse. When reading R6 and R2 if only one connection is detected in the corresponding row HEAVY/SPEED 1 and HIGH water level have been selected. If there are two connections the second one indicates the selected operator option.

The type of panel present is determined along with the brand by the connections made in R6. All models have a minimum of 3 cycles or speeds. This means that a Type I panel will always have at least three connections. A Type II panel will have one or two connections. One if the R6 switch is in the position of HEAVY or SPEED 1. Two if any other cycle is selected. Thus if a scan of R6 has more than two complete circuits the model uses a Type I panel.

While the LEDs used to determine function are very reliable, a failure of an LED, connector, selection means or SRI can cause the control to erroneously delete an option. As an option to this embodiment a capacitor is placed in the paths of the deleted output devices indicating the brand of washer. The impedance of the capacitor makes it is easy to distinguish from both an open circuit and one containing an LED. For brand A no capacitor is added, brand B a capacitor is placed in R6C0 and for Brand C capacitors are placed in R6C0 and R6C1.

Figure 12:
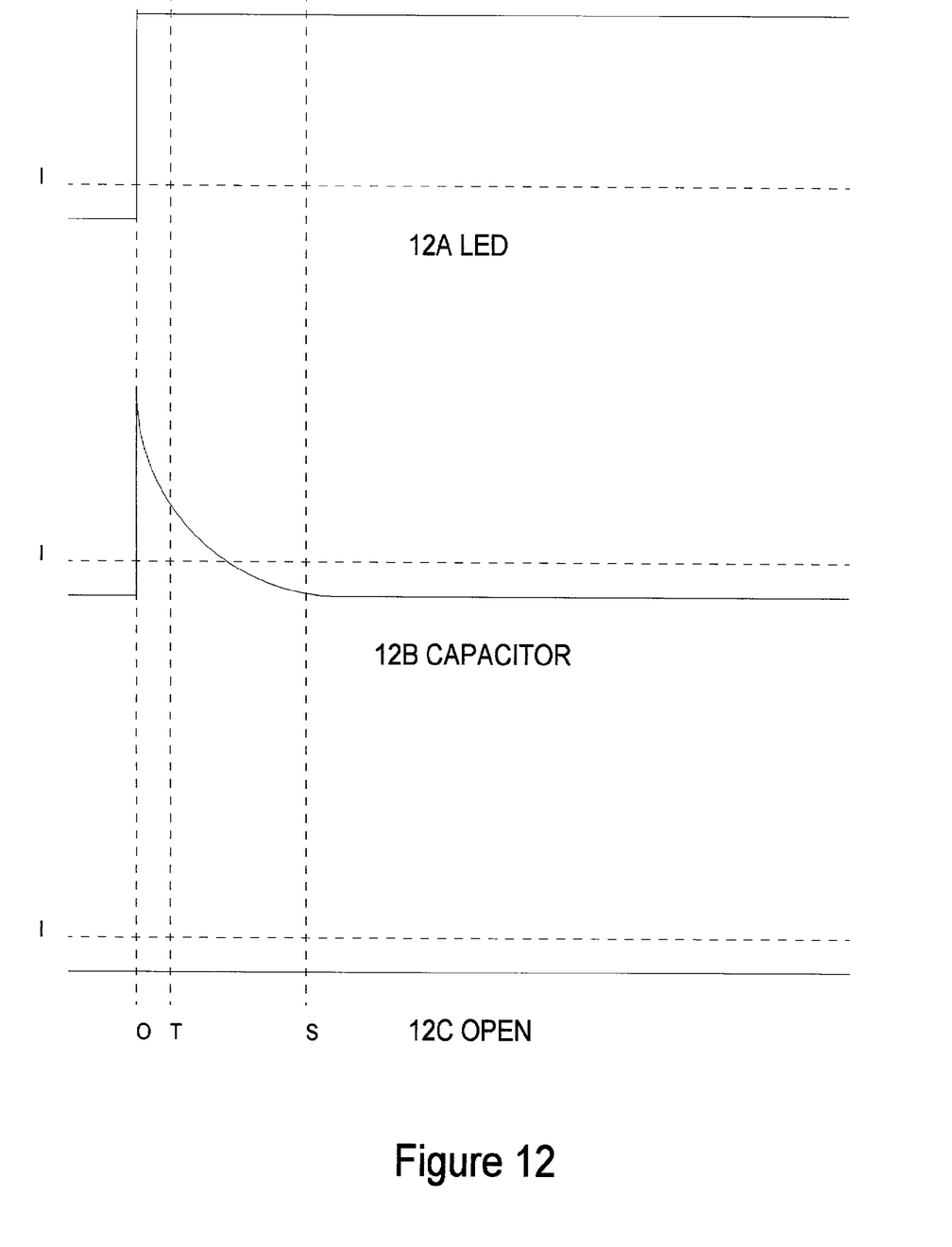
FIGS. 12A–C graph the current through SRI when the tested cell contains an LED, capacitor or is open.

By scanning these locations twice the control can determine the difference between a capacitor, an LED and an error causing an open circuit. FIGS. 12A–C shows the current through the circuit for an LED, a capacitor and when it is open. The path is energized at time O, it is scanned at times, T and S. Input RA0 will be high when the current is more than I. If RA0 is high at both S and T an LED is present. If RA0 is high at T but not S a capacitor is present. If RA0 is not high at T there is a fault.

The first location in R6 containing an LED still indicates the brand. However if any prior cell in R6 scans as open circuit impedance there is a fault since no model has open cell before the first LED. The washer will not operate until repairs have been made.

The preset options indicated by the presence of motor windings and valve solenoids are read when the washer is (re)connected to ac power. While connections could be added to the control panels to indicate these options as well, directly determining the motor and valves present, allows a common panel to repair related models. This reduces service inventories, the consumer might end up with additional operator options, but the control will not select a motor speed or valve it does not have.

The control uses the circuit in FIG. 2 to scan the dc valve interface in this embodiment. U3 and T2 select the valves. U3 is a latched driver. Outputs RC0–RC4 of U1 drive the U3 inputs D8–D4. When RB5 takes Ena of U3 high, any output Q8–Q4 whose corresponding input D8–D4 is a one is on. Outputs whose inputs are zero are off.

When on, an output of U3 connects its valve to ground. When on, transistor T2 connects the valve(s) to +24 v. Diode D10 protects T2 when it shuts off the valve(s), U3 outputs are internally protected. When U1 turns on T3 through R10 by taking RB2 high, transistor T3 pulls the common node of R12, R9 and T2 low enough to turn on T2.

The output of T2 to the valves is sensed using R34. When both T2 and the individual valve lines (U3 outputs) are off, R11 pulls RA1 high through R34. Resistor R34 allows the input protection diodes of input RA1 to limit the input voltage to a safe level (+5.6 v).

To detect the presence of a detergent valve P2, U3 line Q7 alone is turned on. If RA1 goes low the washer has a detergent valve P2. Input RA1 will remain high if there is no detergent valve. Similarly if RA1 goes low when only Q6 is on the washer has a fabric softener valve P3. If RA1 goes low when only Q4 is on the washer has a bleach valve P5. While the presence of hot P1 and cold P4 valves could also be determined each washer operated by this control has both valves. As in the case of the LED a common sensor scans for the presence of multiple valves using U3 to select the circuit to be tested.

For models without a valve the connecting wire of the harness between it and U3 may be eliminated to reduce cost. However, a harness may be used to repair any model for which it has the required connections since a wire in the harness is not sufficient to indicate the presence of a valve. This allows one harness to universally be used in repairs.

The control and connections for a three speed washer are shown in FIG. 3. The motor circuits are selected by relays. The relays are selected by U1 using the latched driver U2. The outputs RC7–RC3 of U1 drive the U2 inputs D1–D5.

When RB7 takes Ena high, any output Q1–Q5 whose corresponding input D1–D5 is a one is on. Outputs whose inputs are zero are off.

Relay K1 is the safety relay when it is open the motor is off. Relay K2 is the switching relay used to switch the motor on and off after the other relays are set. Varistor V2 limits arcing across the points of K2. Relay K5 determines the direction the motor will rotate by the polarity of the connection made to the START winding through capacitor C7 and the centrifugal switch S3. If K5 is on the washer will agitate. If K5 is off the washer will spin.

Relays K3 and K4 are used to select the speed the motor will run at after S3 opens when the motor reaches speed. If K3 is energized the motor will start and run in HIGH regardless of the state of K4. If K3 is off current flows through the HIGH speed winding until speed is reached. Then S3 opens the HIGH winding circuit and directs motor current through the winding selected by K4. If K4 is energized the motor will run in MEDIUM, if it is off the motor will run in LOW. S3 also opens the START winding circuit when speed is reached.

The relays used to switch the motor are considerably more expensive than the switching means used for the valves and the LEDs. To lower cost washers are assembled with a control and wiring harness that is specific to the motor. However to simplify repairs three speed controls and three speed wiring harnesses must be universal replacements. This means only one control must be stocked for repairs. Additionally a two speed control or harness can repair any two or one speed should they be made available to service centers.

Wires 1–9 connect a three speed motor to its control. Two speed controls are made without relay K4. Two speed harnesses do not have the wires 3, 4 and 5 (K4 connections). On two speed models only, S3 and the MEDIUM winding are directly connected as shown by dotted line A. All other connections to the motor remain the same.

One speed controls do not have relays K3 and K4 and the output of K2 is connected to the control terminus of wire 1 by a jumper as indicated by dotted line B. One speed harnesses do not have wires 2, 3, 4 and 5. The centrifugal switch of a one speed motor only has just a single pole—connecting the START winding. The pole of S3 connected to wire 2 on two and three speed motors is not present on one speed motors. All other connections to the motor remain the same.

The presence of S3 between the speed selection means and the motor prevents the use of single sensor to scan both the MEDIUM and LOW windings without starting the motor. Further the scan must work with any functional combination of harnesses and motors. Scanning the MEDIUM winding directly cannot be done with a two speed harness as wire 4 is not present.

The motor is identified by sensing the control termini of wires 2 and 5 by optoisolators U7 and U8 when the motor is off and K4, if present, energized. U7 is connected to the terminus of wire 2 through C9 and R14. U8 is connected to the terminus of wire 5 through C10 and R15. When the input U7 or U8 is connected to a motor winding the corresponding input of U1, RA2 or RA3 will go high. If an input is not connected to a winding the corresponding U1 input remains low pulled down by either R16 and C11 or R13 and C8.

The washer must have wire 2 and a centrifugal switch S3 pole connecting it to the HIGH speed winding for U7 to take RA2 high indicating there are multiple speeds. Since all one speed motors lack a pole to connect wire 2, if present, to any winding, a single speed motor will always scan as a single speed. This allows any speed control or harness to be used to service a one speed unit. Regardless of its capability the control will only select HIGH speed (K3 on, if present) for all operations when the scan indicates a single speed motor.

During the motor scan the terminus of wire 5 on the control is isolated from other motor connections by energizing K4, if present. With K4 energized the washer must have wire 5 and a LOW speed winding for U8 to take RA3 high indicating there are three speeds. Two speed motors do not have this winding and thus will not scan as having three speeds enabling a two or three speed harness to operate a two speed washer. Either two and three speed controls can operate two speed units as only MEDIUM or HIGH speed will be selected.

Thus during a motor scan, if RA2 is low the washer is a single speed. If RA2 is high during the scan the unit has multiple speeds. A multiple speed unit is a two speed if RA3 is low and a three speed if RA3 is high during the scan.

By scanning to determine the type of motor a three speed control is a universal replacement for all washers reducing service inventory requirements. Similarly a three speed harness can replace any harness. If desired a two speed control or wiring harness can repair any one or two speed unit.

The method shown to scan ac circuits is much more expensive than those used to handle the LED and dc valves. An approach to scan ac circuits at a cost comparable to the methods employed to scan dc circuits is demonstrated in an patent application filed concurrently by the present inventor.

While in this embodiment there is only one possible output device for each circuit the inventor contemplates the present invention being applied to devices in which the number and/or type of output device in a circuit must be determined to correctly identify options.

It is claimed:

1. A control for use in a device, the device having at least two models, the control capable of operating a plurality of output transducers, the output transducers converting electrical energy to some other form of energy, the control comprising:
   a selection means for energizing a plurality of circuits each of the plurality of circuits capable of being completed by one of the plurality of output transducers;
   sensing means for scanning each of the plurality of circuits to determine which of the plurality of circuits contains one of the plurality of output transducers; and
   limiting means for limiting the operation of the control to the model for which the required output transducers are determined to be present by the sensing means within the plurality of circuits.

2. The control of claim 1 where the output transducers are display elements.

3. The control of claim 1 where the output transducers are solenoids.

4. The control of claim 1 where the output transducers are motor windings.

5. The control of claim 1 where the output transducers are heating elements.

6. The control of claim 4 where the selection means is a relay.

7. The control of claim 1 where the sensor scans more than one of the plurality of circuits to determine the presence of output transducers.

8. The control of claim 7 where the selecting means selects which of the plurality of circuits is scanned by the sensor.

9. The control of claim 1 where the limiting means determines whether there is a fault in the output transducer.

10. The control of claim 9 where the sensor detects whether a component other than an output transducer is in one of the plurality of circuits, the component being distinguishable from both an output transducer and from a failed output transducer by a scan using the sensing means.

11. A control for operating with a plurality of models, each model having a number of display output transducers, the display output transducers indicating to an operator the operating mode of the model, comprising:
  selection means to energize a plurality of circuits, each of the plurality of circuits capable of containing at least one display output transducers;
  sensing means for scanning the plurality of circuits to identify which of the plurality of circuits contains at least one display output transducers; and
  a limiting means for limiting the operation of the control to a first model for which the required display output transducers are found by the sensing means.

12. The control of claim 11 further comprising:
  means for enabling the selection means, the sensing means, and the limiting means each time a user presses a key.

13. The control of claim 12 where a single sensor of the sensing means scans more than one of the circuits to determine the presence of more than one of the output transducers.

14. The control of claim 13 where the circuits the single sensor scans are selected by the sensing means.

15. The control of claim 11 where in addition to the plurality of models using the display output transducers to indicate the operating mode of the model, the control also operates models using position switches to indicate the operating mode, a pair of contacts of the position switches occupying the circuit which contains display output transducers on other models.

16. The control of claim 15 where the sensing means scans the circuit selected by the selection means to determine the operating mode indicated by the position switches.

17. A method of operating a control, the control capable of operating a first model and a second model, comprising:
  energizing a first circuit;
  detecting the presence or absence of a first transducer in the first circuit by scanning the first circuit;
  enabling the control to be operable with the first model if the first transducer is present in the first circuit; and
  enabling the control to be operable with the second model if the transducer is absent from the first circuit.

18. The method of claim 17 further comprising:
  detecting whether the first transducer has failed.

19. The method of claim 17 further comprising performing a scan of the components within the model to identify the operating modes of the model.

* * * * *